(12) United States Patent
Smith et al.

(10) Patent No.: US 10,731,241 B2
(45) Date of Patent: Aug. 4, 2020

(54) METAL-COATED STEEL STRIP

(75) Inventors: Ross McDowall Smith, Cordeaux Heights (AU); Qiyang Liu, Mount Keira (AU); Joe Williams, Woonona (AU)

(73) Assignee: Bluescope Steel Limited, Melbourne, Victoria (AU)

(*) Notice: Subject to any disclaimer, the term of this patent is extended or adjusted under 35 U.S.C. 154(b) by 0 days.

(21) Appl. No.: 13/322,768

(22) PCT Filed: May 27, 2010

(86) PCT No.: PCT/AU2010/000645
§ 371 (c)(1),
(2), (4) Date: Feb. 15, 2012

(87) PCT Pub. No.: WO2010/135779
PCT Pub. Date: Dec. 2, 2010

(65) Prior Publication Data
US 2012/0135261 A1 May 31, 2012

(30) Foreign Application Priority Data
May 28, 2009 (AU) .................. 2009902441

(51) Int. Cl.
*C23C 2/28* (2006.01)
*C23C 2/26* (2006.01)
(Continued)

(52) U.S. Cl.
CPC .............. *C23C 2/26* (2013.01); *B32B 15/013* (2013.01); *C22C 18/04* (2013.01); *C22C 21/10* (2013.01);
(Continued)

(58) Field of Classification Search
CPC .. C23C 2/06; C23C 2/12; C23C 2/285; C23C 2/28
See application file for complete search history.

(56) References Cited

U.S. PATENT DOCUMENTS 3,297,499 A * 1/1967 Mayhew .................. 148/533
4,108,688 A * 8/1978 Broverman ............... 148/549
(Continued)

FOREIGN PATENT DOCUMENTS

EP 0710732 5/1996
EP 1518941 3/2005
(Continued)

OTHER PUBLICATIONS

Search Report from the European Patent Office for Application No. 10779926.4 dated Sep. 27, 2012 (10 pages).
(Continued)

*Primary Examiner* — David P Turocy
(74) *Attorney, Agent, or Firm* — Michael Best & Friedrich LLP

(57) ABSTRACT

An Al—Zn—Si—Mg alloy coated strip that has $Mg_2Si$ phase particles that are ≤2 μm and have a globular shape. A method of forming an Al—Zn—Si—Mg alloy coated strip comprises (a) heat treating a solidified coating to facilitate globularisation of $Mg_2Si$ phase particles in the coating and/or (b) changing the coating bath chemistry to form intermetallic compound phases that act as nucleation sites for $Mg_2Si$ phase particles with the result that small $Mg_2Si$ particles form on solidification of the coating.

5 Claims, 1 Drawing Sheet

(51) Int. Cl.
*C22C 21/10* (2006.01)
*B32B 15/01* (2006.01)
*C22C 18/04* (2006.01)

(52) U.S. Cl.
CPC ......... *C23C 2/28* (2013.01); *Y10T 428/12028* (2015.01); *Y10T 428/256* (2015.01)

(56) References Cited

U.S. PATENT DOCUMENTS

| | | | |
|---|---|---|---|
| 4,122,240 A | 10/1978 | Banas et al. | |
| 4,157,923 A | 6/1979 | Yen et al. | |
| 4,401,726 A | 8/1983 | Gnanamuthu | |
| 4,401,727 A | 8/1983 | Berke et al. | |
| 4,812,371 A | 3/1989 | Shindou et al. | |
| 5,091,150 A | 2/1992 | Memmi et al. | |
| 5,547,769 A | 8/1996 | Schmitz | |
| 6,635,359 B1* | 10/2003 | Kurosaki et al. | 428/653 |
| 2004/0177903 A1* | 9/2004 | Francois | C21D 9/52 148/533 |
| 2007/0209739 A1* | 9/2007 | Zhao | 148/551 |
| 2010/0224289 A1* | 9/2010 | Wang et al. | 148/549 |

FOREIGN PATENT DOCUMENTS

| | | |
|---|---|---|
| EP | 1557478 | 7/2005 |
| JP | S5814370 | 8/1983 |
| JP | 09-111433 | 4/1997 |
| JP | 09-316618 | 9/1997 |
| JP | 2001-115247 | 4/2001 |
| JP | 2001-355055 | 12/2001 |
| JP | 2004-323974 | 11/2004 |
| JP | 2005-133151 | 5/2005 |
| JP | 2007-284718 | 11/2007 |
| JP | 2012-512168 | 5/2012 |
| WO | 2006105593 | 10/2006 |
| WO | 2007134400 | 11/2007 |
| WO | 2008025086 | 3/2008 |
| WO | 2008141398 | 11/2008 |
| WO | 2009097663 | 8/2009 |

OTHER PUBLICATIONS

International Search Report from PCT/AU2010/000645 dated Jun. 24, 2010.
International Search Report for International Application No. PCT/AU2007/000711 dated Jul. 30, 2007 (3 pages).
International Search Report for International Application No. PCT/AU2008/000738 dated Jul. 15, 2008 (2 pages).
Yuan, G.Y. et al., "Microstructure refinement of Mg—Al—Zn—Si alloys" Material Letters 56, Sep. 2002; pp. 53-58.
Song, P. et al., "Spheroidization of Mg2Si Particles in Mg—4Al—2Si Alloys During Solution Treatment Process" Journal of Materials Engineering, No. 3, 2007 (7 pages).
Second Office Action on Chinese Patent Application No. 201080022702.X dated Jan. 22, 2014 (4 pages).

* cited by examiner

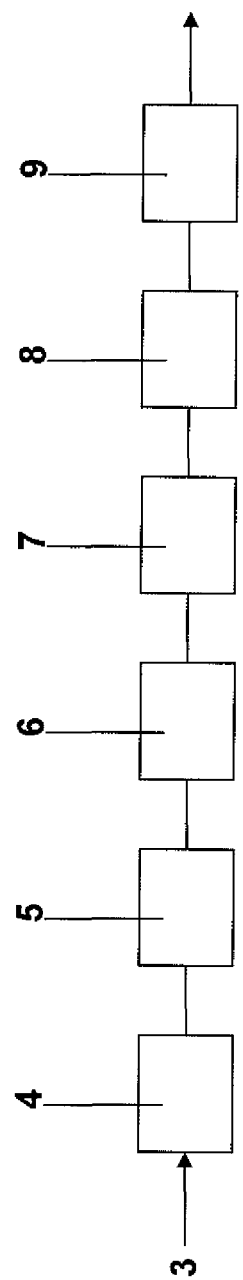

METAL-COATED STEEL STRIP

CROSS-REFERENCE TO RELATED APPLICATIONS

This patent application is a national stage filing under 35 U.S.C. 371 of International Application No. PCT/AU2010/000645, filed May 27, 2010, which claims foreign priority to Australian Patent Application No. 2009902441, filed May 28, 2009, the disclosures of which are incorporated by reference herein in their entireties. Priority to each application is hereby claimed.

The present invention relates to strip, typically steel strip, that has a corrosion-resistant metal alloy coating.

The present invention relates particularly to a corrosion-resistant metal alloy coating that contains aluminium-zinc-silicon-magnesium as the main elements in the alloy, and is hereinafter referred to as an "Al—Zn—Si—Mg alloy" on this basis. The alloy coating may contain other elements that are present as deliberate alloying elements or as unavoidable impurities.

The present invention relates particularly but not exclusively to steel strip that is coated with the above-described Al—Zn—Si—Mg alloy. One major application for these coatings is a thin (i.e. 2-100 μm, typically 3-30 μm thick) coating on the surfaces of steel strip to provide protection against corrosion. This strip can be cold formed (e.g. by roll forming) into an end-use product, such as roofing products.

The term "Al—Zn—Si—Mg alloy" as described hereinafter is understood to mean an alloy that comprises 20-95% Al, up to 5% Si, up to 10% Mg and the balance Zn with other elements in small amounts, typically less than 0.5% for each other element.

The other elements may include any one or more of Fe, Mn, Ni, Sn, Sr, V, Ca, and Sb. In the case of Fe, typically, the amount of Fe is up to 1.5% and is present as an impurity in situations where the coating is formed by a conventional hot-dip coating method.

It is noted that unless otherwise specifically mentioned, all references to percentages of elements in the specification are references to percentages by weight.

Typically, the Al—Zn—Si—Mg alloy comprises the following elements as the major elements in the stated ranges:
 Al: 40 to 60% by weight.
 Zn: 40 to 60% by weight.
 Si: 0.3 to 3% by weight.
 Mg: 0.3 to 10% by weight.

Typically, the corrosion-resistant metal alloy coating is formed on steel strip by a hot dip coating method.

In the conventional hot-dip metal coating method, steel strip generally passes through one or more heat treatment furnaces and thereafter into and through a bath of molten metal alloy held in a coating pot. The heat treatment furnace that is adjacent a coating pot has an outlet snout that extends downwardly to a location close to an upper surface of the bath.

The metal alloy is usually maintained molten in the coating pot by the use of heating inductors. The strip usually exits the heat treatment furnaces via an outlet end section in the form of an elongated furnace exit chute or snout that dips into the bath. Within the bath the strip passes around one or more sink rolls and is taken upwardly out of the bath and is coated with the metal alloy as it passes through the bath.

After leaving the coating bath the metal alloy coated strip passes through a coating thickness control station, such as a gas knife or gas wiping station, at which its coated surfaces are subjected to jets of wiping gas to control the thickness of the coating.

The metal alloy coated strip then passes through a cooling section and is subjected to forced cooling.

The cooled metal alloy coated strip may thereafter be optionally conditioned by passing the coated strip successively through a skin pass rolling section (also known as a temper rolling section) and a tension levelling section. The conditioned strip is coiled at a coiling station.

Depending on the end-use application, the metal-coated strip may be painted, for example with a polymeric paint, on one or both surfaces of the strip.

One corrosion resistant metal coating composition that is used widely in Australia and elsewhere for building products, particularly profiled wall and roofing sheets, is a 55% Al—Zn coating composition that also comprises Si. The profiled sheets are usually manufactured by cold-forming painted, metal alloy coated strip. Typically, the profiled sheets are manufactured by roll-forming the painted strip.

After solidification, a 55% Al—Zn alloy coating normally consists of alpha-Al dendrites and a beta-Zn phase in the interdendritic regions. Silicon is added to the coating alloy composition to prevent excessive alloying between the steel substrate and the molten coating in the hot-dip coating method. A portion of the silicon takes part in quaternary alloy layer formation but the majority of the silicon precipitates as needle-like, pure silicon particles during solidification. These needle-like silicon particles are also present in the interdendritic regions.

It has been found by the applicant that when Mg is included in a 55% Al—Zn—Si coating composition, Mg brings about certain beneficial effects on product performance, such as improved cut-edge protection, by changing the nature of corrosion products formed.

However, it has also been found by the applicant that Mg reacts with Si to form a $Mg_2Si$ phase and that the formation of $Mg_2Si$ phase compromises the abovementioned beneficial effects of Mg in many ways. In particular, the $Mg_2Si$ phase is more voluminous than Si, is brittle, and has a "Chinese script" morphology with sharp edges. All of these factors are potentially harmful to coating ductility or likely to promote coating cracking in high strain fabrication. The applicant has found that greater cracking is undesirable for pre-painted products, particularly when used in "acid-rain" or "polluted" environments, as it offsets the beneficial effect that Mg brings to the corrosion performance of the coated strip under a paint film. Hence, the addition of Mg to 55% Al—Zn—Si coating composition has disadvantages in terms of ductility and how this may affect corrosion performance.

The above description is not to be taken as an admission of the common general knowledge in Australia or elsewhere.

The present invention provides an Al—Zn—Si—Mg alloy coated strip that has $Mg_2Si$ phase particles dispersed in the coating having any one or more of the following features:
 (a) a particle size of ≤2 μm, and
 (b) a more globular shape than the "Chinese script" particles described above.

In addition, the present invention provides a method of forming such an Al—Zn—Si—Mg alloy coated strip with $Mg_2Si$ phase particles dispersed in the coating that comprises:
 (a) heat treating a solidified coating to facilitate globularisation of $Mg_2Si$ phase particles in the coating, and/or (b) changing the coating bath chemistry to form intermetallic compound phases that act as nucleation sites for $Mg_2Si$ particles with the result that small $Mg_2Si$ particles form on solidification of the coating.

According to the present invention there is provided a method of forming a metal coated strip, such as a steel strip, that comprises:

(a) passing the strip through a hot dip coating bath that contains Al, Zn, Si, and Mg and optionally other elements and forming a molten Al—Zn—Si—Mg alloy coating on the strip, (b) cooling the coated strip to solidify the molten Al—Zn—Si—Mg alloy on the strip and form a solidified coating having a microstructure that comprises alpha-Al phase dendrites, Zn-rich phases in interdendritic regions, and $Mg_2Si$ phase particles in interdendritic regions; and (c) heat treating the coated strip at a temperature and for a time to form an Al—Zn phase solid solution from the as-cast microstructure of alpha-Al phase dendrites and the Zn-rich interdendritic phases and to facilitate globularisation of the $Mg_2Si$ phase particles that are dispersed in the coating; and (d) cooling the heat treated strip.

Heat treatment step (c) may be at a temperature of at least 300° C.

Heat treatment step (c) may be at a temperature of at least 350° C.

Heat treatment step (c) may be at a temperature of at least 450° C.

Heat treatment step (c) may be at a temperature of less than 600° C.

Heat treatment step (c) may be for at least 15 minutes.

Heat treatment step (c) may be for 15-30 minutes.

Heat treatment step (c) may be for less than 30 minutes.

Cooling step (b) may comprise cooling the strip at a rate that is sufficiently high to at least partially fragment $Mg_2Si$ phase particles to form fine particles or form fine $Mg_2Si$ phase particles in the first instance in the solidified coating.

The fine $Mg_2Si$ particles may be less than ≤2 μm in size.

Cooling step (b) may comprise cooling the strip at a rate of at least 150° C./sec.

The cooling rate may be at least 200° C./sec.

The cooling rate may be at least 400° C./sec.

The cooling rate may be at least 600° C./sec.

Cooling step (b) may comprise cooling the strip with a water mist or a refrigerated gas.

Cooling step (d) may comprise cooling the heat treated strip at a rate that minimises growth of $Mg_2Si$ phase particles and at least substantially retains the more globular $Mg_2Si$ phase particles that form in the heat treatment step (c).

The coating may be 3-30 microns in thickness.

Coating step (a) may comprise providing the hot dip coating bath with an element or a compound that can act as nucleation sites for $Mg_2Si$ particles.

The other element may be antimony.

The method may comprise forming a coating of a paint on the coated strip.

According to the present invention there is also provided a method of forming a metal coated strip, such as a steel strip, that comprises:

(a) passing the strip through a hot dip coating bath that contains Al, Zn, Si, and Mg, another element or elements or a compound or compounds that can act as nucleation sites for $Mg_2Si$ particles, and optionally other elements and forming a molten Al—Zn—Si—Mg alloy coating on the strip, (b) cooling the coated strip to solidify the molten Al—Zn—Si—Mg alloy on the strip and form a solidified coating having a microstructure that comprises alpha-Al phase dendrites, Zn-rich phases in interdendritic regions, and $Mg_2Si$ phase particles in interdendritic regions of the coating.

The other element may be antimony.

The $Mg_2Si$ particles may be less than ≤2 μm.

The $Mg_2Si$ particles may be a more globular shape and less "Chinese script" morphology with sharp edges.

According to the present invention there is also provided a strip, such as a steel strip, that has a coating of an Al—Zn—Si—Mg alloy on the strip that has a microstructure that comprises a solid solution of an Al—Zn phase and a dispersion of particles of $Mg_2Si$ phase in the coating, with the $Mg_2Si$ particles having:

(a) a particle size of ≤2 μm, and
(b) a globular shape.

The coating may have a thickness of 5-30 microns on at least one side of the strip.

The coating microstructure produced by the present invention is advantageous in terms of improved coating ductility and enhanced corrosion resistance.

Improved coating ductility.

Fine, more globular $Mg_2Si$ particles than the "Chinese script" morphology with sharp edges described above reduces stress concentration in high strain fabrication and thus reduces the potential for crack initiation and propagation.

Enhanced coating corrosion resistance.

The modification of the $Mg_2Si$ phase to be fine, more globular particles than the "Chinese script" morphology with sharp edges described above reduces the potential for coating cracking. Greater dispersion of $Mg_2Si$ phase particles in the coating is also beneficial in terms of promoting uniform "blocking" and "activation" of corrosion channels. Consequently, there is enhanced corrosion resistance of the coating.

The present invention is described further by way of example with reference to the accompanying Figure which is a schematic drawing of one embodiment of a continuous production line for producing steel strip coated an Al—Zn—Si—Mg alloy in accordance with the method of the present invention.

With reference to the Figure, in use, coils of cold rolled steel strip are uncoiled at an uncoiling station (not shown) and successive uncoiled lengths of strip are welded end to end by a welder (not shown) and form a continuous length of strip 3.

The strip 3 is then passed successively through an accumulator (not shown), a strip cleaning section (not shown) and a furnace assembly 4. The furnace assembly 4 includes a preheater, a preheat reducing furnace, and a reducing furnace.

The strip is heat treated in the furnace assembly 4 by careful control of process variables including: (i) the temperature profile in the furnaces, (ii) the reducing gas concentration in the furnaces, (iii) the gas flow rate through the furnaces, and (iv) strip residence time in the furnaces (ie line speed).

The process variables in the furnace assembly 4 are controlled so that there is removal of iron oxide residues from the surface of the strip and removal of residual oils and iron fines from the surface of the strip.

The heat treated strip is then passed via an outlet snout downwardly into and through a molten bath containing an Al—Zn—Si—Mg alloy held in a coating pot 5 and is coated with Al—Zn—Si—Mg alloy. The bath may contain one or more elements or compounds that promote the formation of intermetallic compound phases that act as nucleation sites for $Mg_2Si$ particles with the result that small $Mg_2Si$ particles form on solidification of the coating. Preferably the Al—Zn—Si—Mg alloy is maintained molten in the coating pot 5 by use of heating inductors (not shown). Within the bath the strip passes around a sink roll and is taken upwardly out of the bath. Both surfaces of the strip are coated with the aluminium-zinc-silicon alloy as it passes through the bath.

After leaving the coating bath 5 the strip passes vertically through a gas wiping station 6 at which its coated surfaces are subjected to jets of wiping gas to control the thickness of the coating.

The coated strip is then passed through a cooling section 7 and subjected to forced cooling. Preferably, the strip is cooled at a rate that is sufficiently high to at least partially fragment $Mg_2Si$ phase particles to form fine particles or form fine $Mg_2Si$ phase particles in the first instance in the solidified coating. Typically, this will mean cooling the strip at a rate of at least 300° C./sec.

The cooled, coated strip, is then passed through a rolling section 8 that conditions the surface of the coated strip.

Finally, the conditioned strip is passed through a heat treatment furnace 9 and heat treated in the furnace. Specifically, the strip is heat treated at a temperature in the range of 320-500° C. for 15-30 minutes to facilitate globularisation of the $Mg_2Si$ phase particles in the coating. The heat treated strip is then cooled, typically water-cooled, to maintain the $Mg_2Si$ phase particles as close as possible to the size and shape at the end of the heat treatment step.

Many modifications may be made to the present invention as described above without departing from the spirit and scope of the invention.

The invention claimed is:

1. A method of forming a steel coated strip that comprises:
    (a) passing the strip through a hot dip coating bath that contains Al, Zn, Si, and Mg and optionally other elements and forming a molten Al—Zn—Si—Mg alloy coating of 3-30 µm in thickness on the strip, wherein the Al—Zn—Si—Mg alloy coating comprises 40-60% by weight Al, 40-60% by weight Zn, 0.3-3% by weight Si, 0.3-10% by weight Mg;
    (b) solidifying the molten Al—Zn—Si—Mg alloy on the strip to form a solidified coating by a cooling step consisting of cooling the coated strip only at a rate of at least 300° C./sec, the solidified coating having a microstructure that comprises alpha-Al phase dendrites, Zn-rich phases in interdendritic regions, and $Mg_2Si$ phase particles in interdendritic regions, with the $Mg_2Si$ phase particles being at least partially fragmented $Mg_2Si$ phase particles or being formed as fine $Mg_2Si$ phase particles in the first instance as a consequence of the cooling rate;
    (c) heat treating the coated strip in a furnace at a temperature of at least 300° C. and less than 600° C. and for a time less than 30 minutes and forming (i) an Al—Zn phase solid solution from the as-cast microstructure of alpha-Al phase dendrites and the Zn-rich interdendritic phases and (ii) globular-shaped $Mg_2Si$ phase particles dispersed in the Al—Zn phase solid solution, with the $Mg_2Si$ phase particles having a particle size of 2 µm or less; and
    (d) water cooling the heat treated strip at a rate that minimizes growth of $Mg_2Si$ phase particles and at least substantially retains the globular $Mg_2Si$ phase particles that form in the heat treatment step (c).

2. The method defined in claim 1 wherein heat treatment step (c) is for at least 15 minutes.

3. The method defined in claim 1 wherein cooling step (b) comprises cooling the strip at a rate of at least 600° C./sec.

4. The method defined in claim 1 wherein coating step (a) comprises providing the hot dip coating bath with an element or a compound that can act as nucleation sites for $Mg_2Si$ particles.

5. The method of claim 1, wherein the heat treatment step (c) is at a temperature of 320-500° C.

\* \* \* \* \*